United States Patent
Song

(10) Patent No.: US 7,479,894 B2
(45) Date of Patent: Jan. 20, 2009

(54) APPARATUS AND METHOD OF PROTECTING BATTERY PACKS

(75) Inventor: Jung Yong Song, Bucheon-si (KR)

(73) Assignee: LG Chem, Ltd. (KR)

( * ) Notice: Subject to any disclaimer, the term of this patent is extended or adjusted under 35 U.S.C. 154(b) by 272 days.

(21) Appl. No.: 11/408,308

(22) Filed: Apr. 21, 2006

(65) Prior Publication Data

US 2006/0250262 A1 Nov. 9, 2006

(30) Foreign Application Priority Data

Apr. 21, 2005 (KR) .................. 10-2005-0033053

(51) Int. Cl.
  *G08B 21/00* (2006.01)
  *H01M 2/00* (2006.01)
(52) U.S. Cl. .................... 340/636.1; 429/61
(58) Field of Classification Search ............. 340/436, 340/665, 669, 670, 679, 686.1, 686.5, 636.1; 701/29–36, 45–49, 62; 180/271, 279; 429/61
See application file for complete search history.

(56) References Cited

U.S. PATENT DOCUMENTS 6,664,000 B1 * 12/2003 Sonobe .................. 429/61

FOREIGN PATENT DOCUMENTS

JP 11040205 2/1999
KR 19990085939 12/1999

* cited by examiner

*Primary Examiner*—Jeff Hofsass
*Assistant Examiner*—Sigmund Tang
(74) *Attorney, Agent, or Firm*—Cantor Colburn LLP

(57) ABSTRACT

Disclosed are an apparatus and a method for protecting a battery pack. The apparatus includes: a sensor for detecting external physical impact so as to output a voltage signal; a first protection circuit for receiving the voltage signal output from the sensor; a gauging IC for determining whether the voltage received from the first protection circuit is larger than a predetermined value, so as to output the voltage signal to either the first protection circuit or a second protection circuit; the second protection circuit for receiving the voltage signal from the gauging IC; and an alarm circuit connected to the first and second protection circuits so as to receive the voltage signal from the first and second protection circuits and raise an alarm signal.

9 Claims, 4 Drawing Sheets

APPARATUS AND METHOD OF PROTECTING BATTERY PACKS

This application claims the benefit of Korean Patent Application No. 10-2005-0033053, filed on Apr. 21, 2005 in Korea Industrial Property Office, which is hereby incorporated by reference in its entirety for all purposes as if fully set forth herein.

BACKGROUND OF THE INVENTION

1. Field of the invention

The present invention relates to an apparatus for protecting battery packs. Particularly, the present invention relates to an apparatus and a method for protecting battery packs, which includes a sensor provided on a side of an electric source so as to be capable of detecting impact intensity, thereby generating alarm signals when vibration due to an external physical impact is detected.

2. Description of the Prior Art

A conventional circuit for protecting battery packs detects voltage, current, and temperature of a battery pack so as to prevent overcharge, over-discharge, over-current, and short-circuiting, while detecting the temperature of a thermistor, thereby protecting the battery pack from overheating. However, the conventional circuit has no function for determining if the battery pack is safe when physical impact is applied to the battery pack. Thus, there is a disadvantage in that cells in the battery pack may be ignited or exploded.

Hereinafter, the conventional circuit for protecting the battery pack will be described with reference to FIG. 1.

Referring to FIG. 1, in the conventional battery pack, a main electric source (which includes a positive terminal and a negative terminal) applies an electric current to the cells of the battery pack to be charged. Switches 2 and 3 convert the electric current input from the main electric source into a voltage and an electric current adapted to the battery to be charged. A current detector detects the electric current to be charged in the battery, while a voltage detector detects the voltage of the battery pack. Further, a thermistor checks the temperature of the battery pack. The current detector, the voltage detector, and the thermistor provide information relating to the electric current, the voltage, and the temperature to a gauging IC 4, respectively. The gauging IC 4 receives the information relating to the current, the voltage, and the temperature. A first protection circuit 5 prevents overcharge, over-discharge, over-current, and short-circuiting of the battery pack using the given information, while a second protection circuit 6 carries out secondary protection operation.

As described above, the conventional protection circuit 100 for the battery pack has no means for warning of the physical impact, or for controlling the safety of the battery pack.

Accordingly, it has increased the necessity for a protection circuit for a battery pack, which has a function of raising an alarm for physical impact as well as a function of measuring the voltage, the current, and the temperature of the battery pack so as to maintain the safety of the battery pack.

SUMMARY OF THE INVENTION

Accordingly, the present invention has been made to solve the above-mentioned problems occurring in the prior art, and it is an object of the present invention to provide an apparatus and a method for protecting battery packs, which includes an advanced circuit for protecting the battery packs, thereby protecting the battery packs from physical impact and securing the safety of the battery packs.

In order to accomplish the object of the present invention, according to an embodiment of the present invention, there is provided an apparatus for protecting a battery pack, which includes: a sensor for detecting external physical impact so as to output a voltage signal; a zener diode to which electricity is applied when the sensor outputs the voltage signal which is larger than a predetermined value of voltage; switching elements which are turned on/off depending on the electricity passing through the zener diode; and an alarm circuit for generating an alarm signal depending on the voltage signal output from the sensor. Here, the switching elements interrupt supply of the electricity from a main electric source of the battery pack.

According to the present invention, the alarm circuit includes multicolored light emitting diodes to emit red, yellow, and green lights according to the voltage output from the sensor.

The sensor preferably includes at least one of a piezoelectric sensor, a pressure sensor, and an impact sensor.

In order to accomplish the object of the present invention, according to another embodiment of the present invention, there is provided an apparatus for protecting a battery pack according to another embodiment of the present invention, includes: a sensor for detecting external physical impact so as to output a voltage signal; a first protection circuit for receiving the voltage signal output from the sensor; a gauging IC for determining if the voltage received from the first protection circuit is larger than a predetermined value, so as to output the voltage signal to either the first protection circuit or a second protection circuit; the second protection circuit for receiving the voltage signal from the gauging IC; and an alarm circuit connected to the first and second protection circuits so as to receive the voltage signal from the first and second protection circuits and raise an alarm signal.

In order to accomplish the object of the present invention, according to an aspect of the present invention, there is provided a method for protecting a battery pack, comprises the steps of: detecting physical impact using a sensor so as to output a voltage signal; determining if a value of the voltage signal output from the sensor is within a predetermined range by using a gauging IC; making the light emitting diodes emit the green light, when the value of the voltage signal is within the predetermined range; determining if the value of the voltage signal is larger than a predetermined value, when the value of the voltage signal is out of the predetermined range; outputting the voltage signal from the gauging IC to the second protection circuit, when the value of the voltage signal is larger than the predetermined value; outputting the voltage signal received from the second protection circuit to the alarm circuit, so as to make the light emitting diodes emit the red light; outputting the voltage signal from the gauging IC to the first protection circuit when the value of the voltage signal is smaller than the predetermined value; and outputting the voltage signal received from the first protection circuit to the alarm circuit, so as to make the light emitting diodes emit the yellow light.

In the method for protecting a battery pack according to the present invention, the sensor preferably includes at least one of a piezoelectric sensor, a pressure sensor, and an impact sensor.

DETAILED DESCRIPTION OF THE PREFERRED EMBODIMENTS

Figure 1:
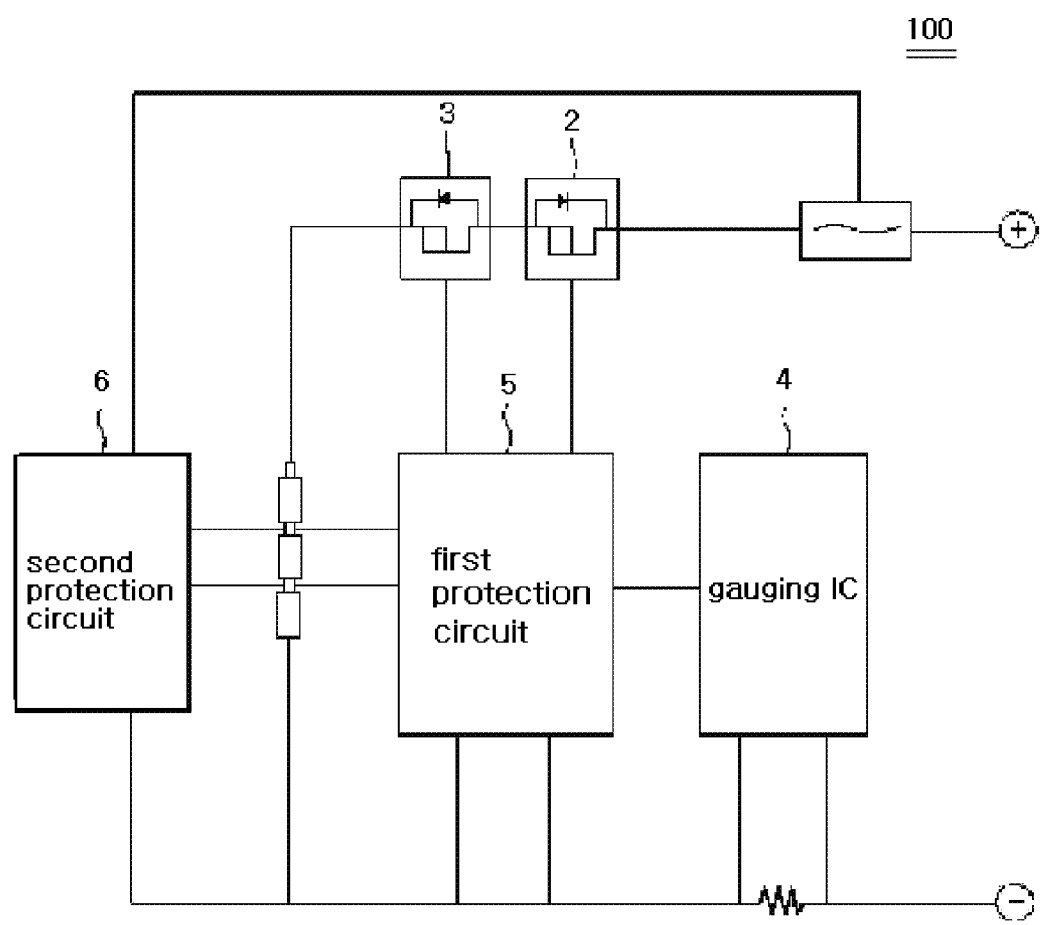
FIG. 1 is a schematic view showing a conventional apparatus for protecting battery packs.

Hereinafter, a preferred embodiment of the present invention will be described with reference to the accompanying drawings. The same reference numerals are used to indicate identical structural elements in the accompanying drawings according to the present invention.

Figure 2:
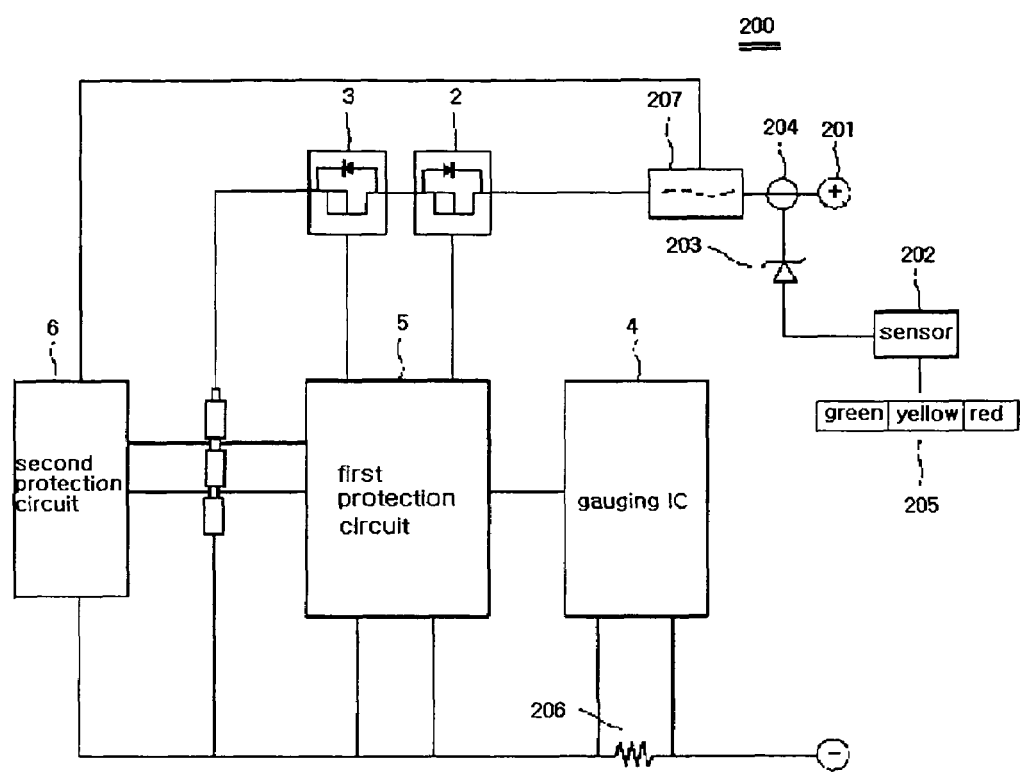
FIG. 2 is a circuit diagram of an apparatus for protecting battery packs according to the embodiment of the present invention, in which the apparatus has a structure that generates alarm signals when vibration due to an external physical impact is detected.

FIG. 2 is a circuit diagram of an apparatus 200 for protecting battery packs according to the embodiment of the present invention, in which the apparatus has a structure that generates alarm signals when vibration due to an external physical impact is detected.

The apparatus 200 for protecting the battery pack according to the embodiment of the present invention, includes the battery pack having a cell array, a main electric source 201 for applying an electric current to the cells of the battery pack, a sensor 202 for detecting a predetermined intensity of outer impact so as to output a voltage signal, an alarm circuit 205 for generating an alarm signal depending on the voltage signal output from the sensor 202, a zener diode 203 to which the voltage signal generated by the sensor is applied, and a switch 204 for turning off the main electric source when the voltage signal is applied to the zener diode.

The sensor 202 includes a piezoelectric sensor for detecting a predetermined intensity of the outer impact so as to output a voltage signal.

The alarm circuit 205 includes light emitting diodes (LEDs) for emitting red, yellow, and green, etc., respectively. In this description, although the alarm circuit having the LEDs is described, it is understood by a person skilled in this art that a visually recognizable indication unit can be used. Further, an audible alarm may be issued to a user with respect to the state of the battery pack.

The main electric source 201 applies electricity to the battery pack in order to charge the battery pack. The applied electricity is converted by switches 2 and 3 into a voltage and a current adapted for the charge of the battery pack. The cells of the battery pack are charged with the voltage and current.

A resistor 206 detects the current with which the battery pack is charged, and gives a gauging IC 4 the information relating to the battery pack.

The gauging IC 4 detects the voltage of the battery pack through a voltage detection portion, while checking the temperature of the battery pack through a thermistor. Depending on the information with relation to the voltage, the current, and the temperature of the battery pack, the gauging IC 4 controls the battery pack in order to prevent overcharge, overdischarge, and over-current of the battery pack, by using first and second protection circuits 5 and 6. Further, the gauging IC 4 prevents the overheat of the battery pack using the temperature information, so as to secure the safety of the battery pack.

On the other hand, the sensor 202 detects external physical impact and converts the physical impact into a voltage signal so as to make the LEDs emit lights respectively, so that a user can recognize that external impact has been applied to the battery pack. At the same time, electricity is applied to the zener diode 203 and thereby the switch 204 is turned off so as to interrupt the supply of electricity from the main electric source. Such an operation prevents the inner cells of the battery pack from being ignited or exploded.

Figure 3:
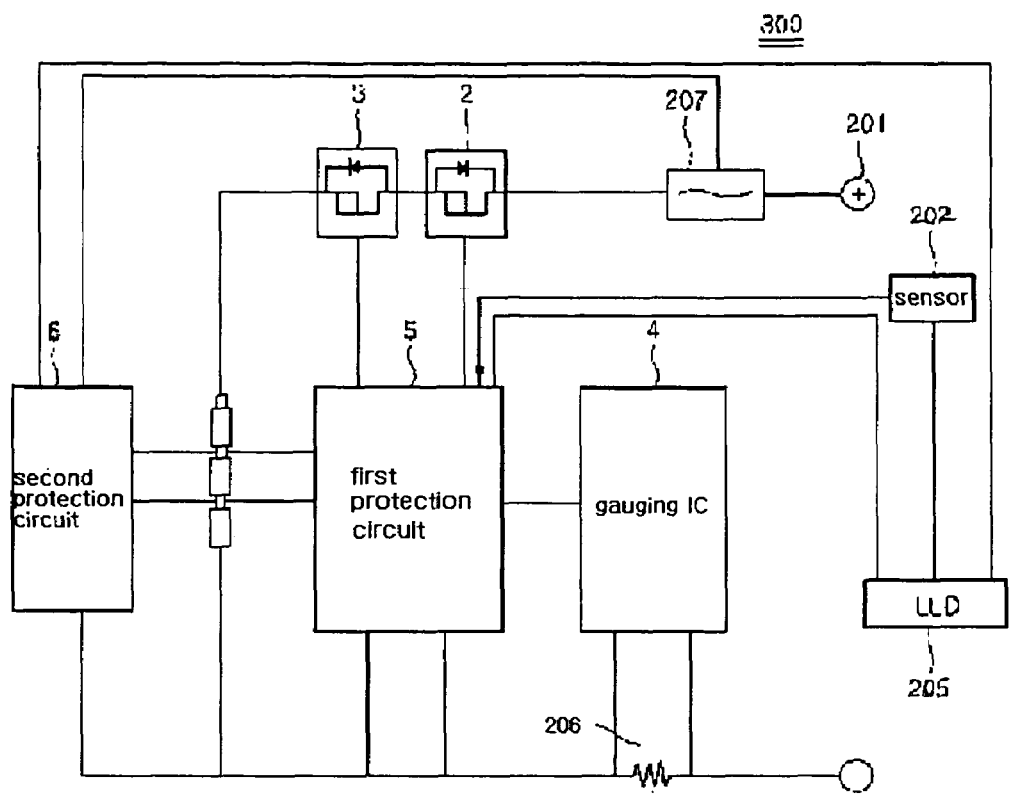
FIG. 3 is a circuit diagram of an apparatus for protecting battery packs according to another embodiment of the present invention, in which the apparatus has a structure that generates various alarm signals when vibration due to an external physical impact is detected.

FIG. 3 is a circuit diagram of an apparatus for protecting a battery pack according to another embodiment of the present invention, in which the apparatus has a structure that generates alarm signals when external physical impact is detected.

Referring to FIG. 3, the apparatus 300 for protecting the battery pack includes the battery pack having a cell array, a main electric source 201 for supplying electricity to the cells of the battery pack, a sensor 202 for detecting a predetermined intensity of physical impact so as to output voltage signals, a first protection circuit 5 for receiving the voltage signals output from the sensor 202, a gauging IC 4 for calculating the voltage received from the first protection circuit 5 so as to control the battery pack, a second protection circuit 6 for receiving the voltage signals from the gauging IC 4 when the calculated voltage is larger than a predetermined voltage, and an alarm circuit 205 connected to the first and second protection circuits 5 and 6 so as to generate alarm signals.

The sensor 202 detects a predetermined intensity of the external impact and outputs the voltage signal. The sensor 202 includes a piezoelectric sensor using a piezoelectric effect in which charges are created in proportion to force applied to both surfaces of a crystal plate when pressure is applied to the crystal plate in a certain direction, a pressure sensor using a characteristic in which a substance is deformed by or responds to pressure when the pressure is applied thereto, and an impact sensor having two electrodes which are detached from each other so as to detect vibration when the magnitude of the vibration is larger than a predetermined value during the application of electric current to a switch to which the vibration may be transmitted. It is understood by a person skilled in this art that various kinds of sensors can be used in the scope of the present invention.

The alarm circuit 205 includes Light Emitting Diodes (LEDs) for emitting red, yellow, green lights, etc.

The main electric source 201 applies electricity to the battery pack in order to charge the battery pack. The applied electricity is converted by the switches 2 and 3 into voltage and current adapted to the electric source. The cells of the battery pack are charged with the voltage and the current.

The resistor 206 detects the current with which the battery pack is charged, and gives a gauging IC 4 the information with respect to the current.

The gauging IC 4 detects the voltage of the battery pack through a voltage detecting portion, and also checks the temperature of the battery pack through a thermistor. Depending on the information relating the voltage, the current, and the temperature of the battery pack, the gauging IC 304 controls the battery pack using the first and second protection circuits 5 and 6, in order to prevent overcharge, over-discharge, and over-current of the battery pack, and also prevents the overheat of the battery pack depending on the information relating to the temperature of the battery pack so as to secure the safety of the battery pack.

As described above, the sensor 202 detects and converts the external outer impact into the voltage signals, so as to output the voltage signals to the first protection circuit 5.

The gauging IC 4 receives the voltage signals from the first protection circuit 5, and compares the voltage signals with a voltage value which is already set. The "preset voltage value" refers to a value that outer impact has no effect on the battery pack.

Therefore, the gauging IC 4 receives the voltage signal from the first protection circuit 5, and compares the voltage signals with the preset voltage value. As a result, when the received voltage signals are larger than the preset voltage value, the gauging IC 4 outputs the voltage signals to the second protection circuit 6.

Upon receiving the voltage signals, the second protection circuit 6 interrupts the supply of the electricity from the main electric source 201 to a fuse 207 so that the electricity is not applied to the battery pack and the alarm circuit (i.e. LED) emits the red light.

Further, when the voltage signals received from the first protection circuit 5 are within a range of the preset voltage value, the gauging IC 4 outputs the voltage signals to the first protection circuit 5. The LED 205 emit the yellow light according to the voltage signals.

Therefore, when the external impact is applied to the battery pack, the protection circuits for the battery pack according to the present invention can detect the impact and visually display the intensity of the impact through the alarm circuit, i.e. multicolored LED.

Hereinafter, a method for protecting the battery pack according to the present invention will be described with reference to FIG. 4.

Figure 4:
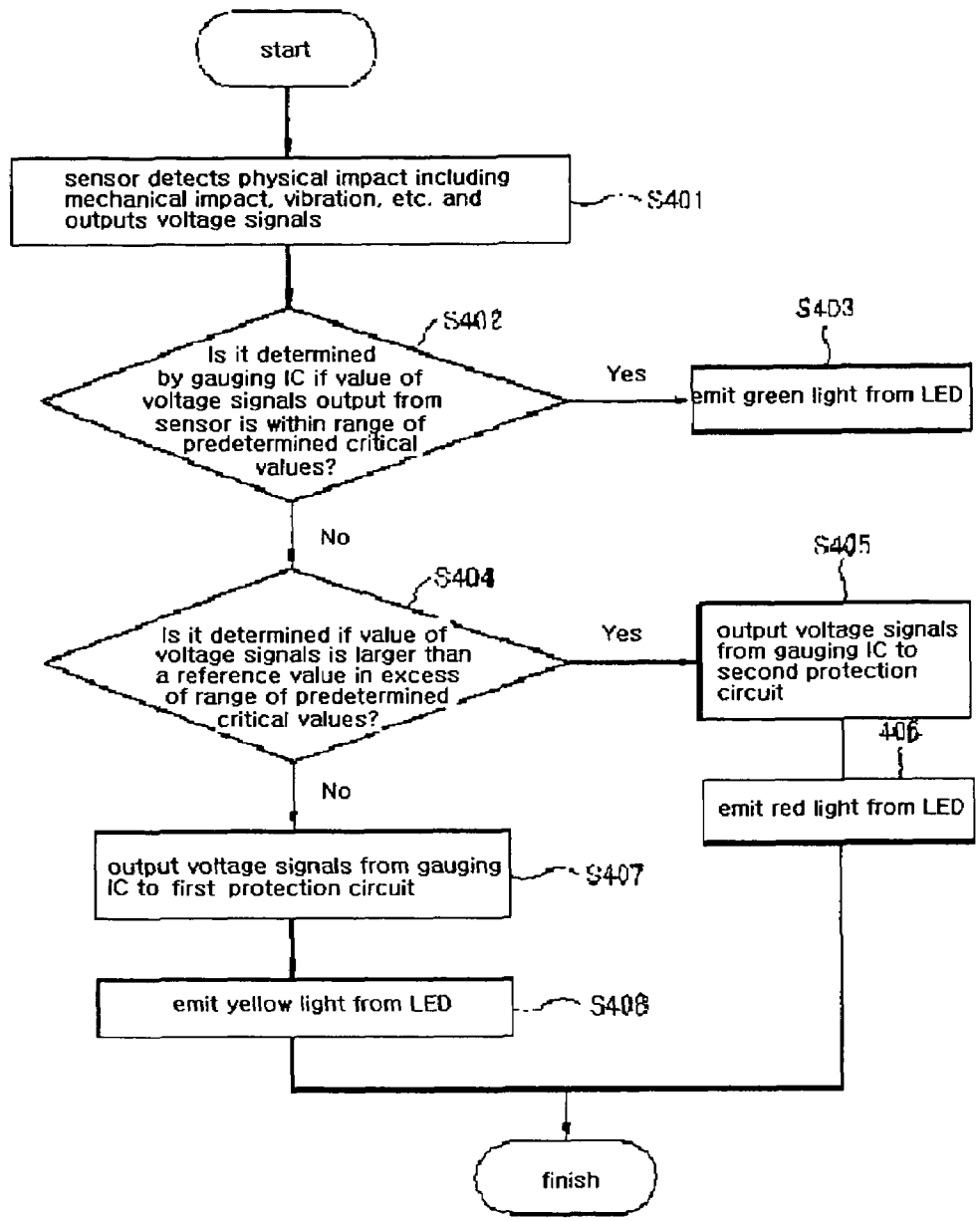
FIG. 4 is a flowchart illustrating a method for protecting battery packs from an external physical impact according to the embodiment of the present invention.

Referring to FIG. 4, in step S401, the sensor 202 detects the physical impact including mechanical vibration and outputs the voltage signals.

In step S402, the gauging IC 4 determines if the value of the voltage signals output from the sensor 202 is within a range of predetermined critical values.

In step S403, if the value of the voltage signals output from the sensor 202 is within the range of the predetermined critical value, the LEDs emit the green light.

In step S404, when the value of the voltage signals output from the sensor 202 is out of the range of the predetermined critical value, the gauge IC 4 determines if amount of the value in excess of the critical values is larger than a reference value. The determination whether the exceeding value is large or small is based on the use of the battery pack and a design specification for the battery pack.

In step S405, if the value in excess of the critical value is large, the gauging IC outputs the voltage signal to the second protection circuit and makes the second protection circuit interrupt the supply of electricity to the fuse 207, so that the LEDs emits the red light.

In step S406, if the value in excess of the critical value is small, the gauging IC outputs the voltage signals to the first protection circuit and makes the first protection circuit operate the LEDs, so that the LEDs emits the yellow light.

INDUSTRIAL APPLICABILITY

As described above, the apparatus for protecting the battery packs according to the present invention includes a sensor disposed on the main electric source so as to be capable of detecting impact intensity, and light emitting diodes illuminated by voltage signals output from the sensor, thereby protecting the battery pack from physical impact.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. The apparatus for protecting a battery pack, comprising:
   a sensor for detecting external physical impact so as to output a voltage signal;
   a first protection circuit for receiving the voltage signal output from the sensor;
   a gauging IC for determining if the voltage received from the first protection circuit is larger than a predetermined value, so as to output the voltage signal to either the first protection circuit or a second protection circuit;
   the second protection circuit for receiving the voltage signal from the gauging IC; and
   an alarm circuit connected to the first and second protection circuits so as to receive the voltage signal from the first and second protection circuits and raise an alarm signal.

2. The apparatus for protecting a battery pack as claimed in claim 1, wherein the alarm circuit includes multicolored light emitting flashing different colors according to the voltage level of the voltage signal received from the first protection circuit.

3. The apparatus for protecting a battery pack as claimed in claim 1, wherein the gauging IC outputs the voltage signal to the alarm circuit through the first protection circuit when the voltage signal output from the sensor is smaller than a predetermined value.

4. The apparatus for protecting a battery pack as claimed in claim 1, wherein the gauging IC outputs the voltage signal to the alarm circuit through the second protection circuit when the voltage signal output from the sensor is larger than a predetermined value.

5. A method for protecting a battery pack, comprising the steps of:
   connecting a first protection circuit connected to a sensor and detecting a sensor voltage signal, and a second protecting circuit to a alarm circuit including multicolored light emitting diodes;
   receiving a voltage signal output from the first protection circuit;
   determining if a value of the voltage signal output is within a predetermined range;
   selecting either the first protection circuit or the second protection circuit based on whether or not the value of the voltage signal output is in excess of the predetermined range; and
   outputting the alarm signal to the selected protection circuit.

6. The method for protecting a battery pack as claimed in claim 5, wherein the determination step further includes a step of determining if the value of the voltage signal is larger than a predetermined value, when the value of the voltage signal is out of the predetermined range.

7. The method for protecting a battery pack as claimed in claim 6, wherein when the value of the voltage signal is larger than the predetermined value, the method further comprises the step of selecting the second protection circuit and outputting the alarm signal to the second protection circuit so as to make the alarm circuit to emit a first color light.

8. The method for protecting a battery pack as claimed in claim 7, wherein when the value of the voltage signal is smaller than the predetermined value, the method further comprises the step of selecting the first protection circuit and outputting the alarm signal to the first protection circuit so as to make the alarm circuit to emit a second color light.

9. The method for protecting a battery pack as claimed in claim 5, wherein the sensor includes at least one of a piezo-electric sensor, a pressure sensor, and an impact sensor.

* * * * *